United States Patent [19] [11] 3,871,703
Accatino [45] Mar. 18, 1975

[54] SUN VISOR OF PLASTICS FOR MOTOR VEHICLES AND MANUFACTURING METHOD

[75] Inventor: Augusto Accatino, Turin, Italy

[73] Assignee: Stat S.n.c. di Accatino & C., Turin, Italy

[22] Filed: Oct. 2, 1973

[21] Appl. No.: 402,691

[30] Foreign Application Priority Data
Oct. 5, 1972 Italy .................................. 70142/72

[52] U.S. Cl. ............................. 296/97 H, 296/97 B
[51] Int. Cl. ............................................... B60j 3/00
[58] Field of Search .... 296/97 R, 97 B, 97 H, 97 A, 296/97 E, 97 F, 97 G, 97 J, 97 K

[56] References Cited
UNITED STATES PATENTS
3,445,135  5/1969  Masi ................................ 296/97 H
3,751,106  8/1973  Mahler ............................. 296/97 H
FOREIGN PATENTS OR APPLICATIONS
1,163,176  2/1964  Germany .......................... 296/97 H
1,955,674  6/1970  Germany .......................... 296/97 H 574,552  3/1958  Italy ................................ 296/97 H Primary Examiner—Robert B. Reeves
Assistant Examiner—Larry H. Martin
Attorney, Agent, or Firm—Sughrue, Rothwell, Mion, Zinn & Macpeak

[57] ABSTRACT

A sun visor for motor vehicles comprising an integrally moulded substantially flat, generally rectangular unitary body comprising two substantially rectangular half shells integrally joined along one of their longer edges, with a longitudinal reinforcing rib extending along this edge between the two half shells. Projecting from the longitudinal rib there are a plurality of transverse ribs, also integrally formed with the half-shells. A method of manufacturing the sun visor is also disclosed. This involves the use of a mould having a central mandrel and two outer dies. The mould is shaped such that the body is initially moulded with the two half-shells divergent from one another in the region of the long edge opposite the edge having the longitudinal reinforcing rib, the edges of the half shells are welded together to complete the body after removal from the mould.

4 Claims, 11 Drawing Figures

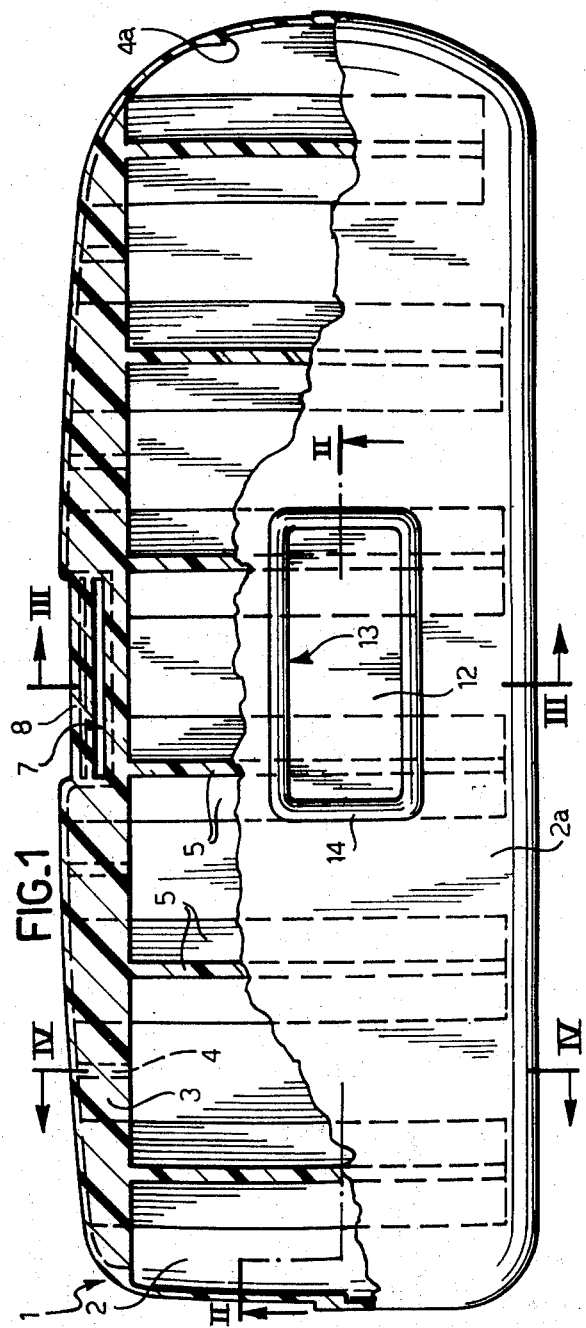
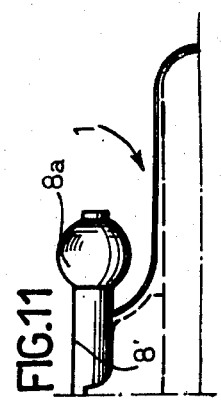
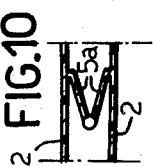
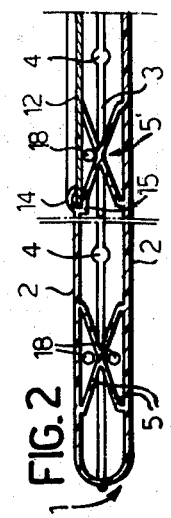

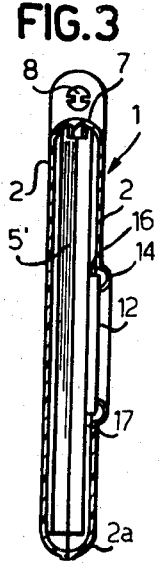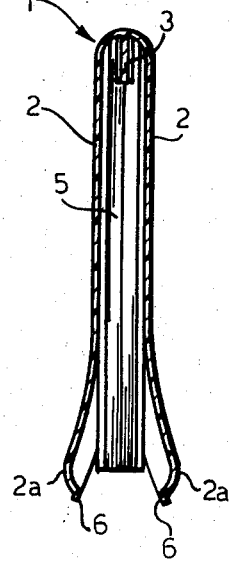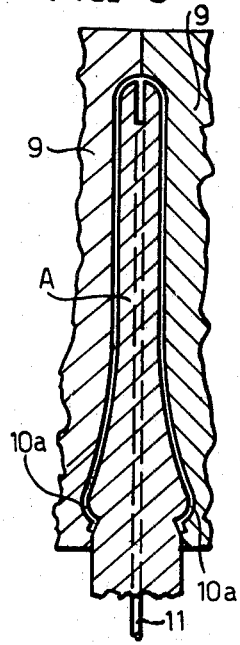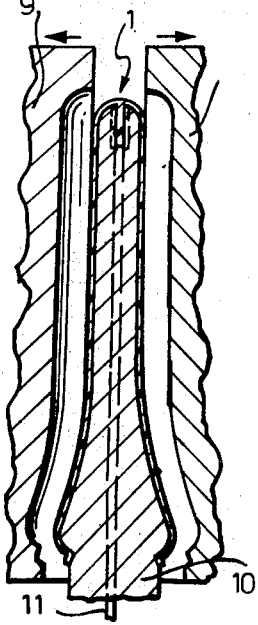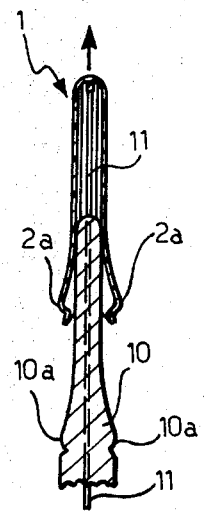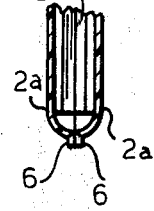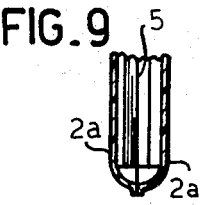

SUN VISOR OF PLASTICS FOR MOTOR VEHICLES AND MANUFACTURING METHOD

This invention relates to a sun visor for motor vehicles, and particularly to a sun visor of the type comprising an opaque and substantially rectangular planar member, mounted so as to be pivotable about one of its longer sides above the windscreen in the passenger compartment of the vehicle. The pivotal attachment permits the visor to be moved from a raised position where it lies substantially parallel to the roof of the passenger compartment of the car, to a lowered position where it comes between the windscreen and the eyes of the driver or of the passenger, so as to prevent the sun from shining directly into the eyes of the driver or the passenger. Some visors are mounted on one corner so that they can also be turned to protect the eyes from the glare of the sun if it is shining through a side window.

For reasons of safety it is necessary for the visor to be well padded or formed as a resilient body so as not to cause damage to the occupants of the car in the event of an accident. Therefore such visors are normally constructed from a peripheral frame (generally metal) with a covering of plastics material or of cloth, enclosing a padding material. The visor is held together by the covering which is in general formed from two flat pieces connected together by sewing or peripheral welding. Such a structure is complex and laborious to manufacture since it is necessary to manufacture separately the various components and then assemble them together, and this makes the finished visor unnecessarily expensive.

The present invention seeks to provide a sun visor for motor vehicles which may be manufactured readily, and which would comply with even the strictest safety requirements, while nevertheless being cheaper to manufacture than previously known such visors.

One feature of embodiments of the present invention is that they have a smaller number of component parts than known types of visors, and require no assembling operations.

According to one aspect of this invention a sun visor for motor vehicles comprises a unitary, substantially flat, generally rectangular body, integrally moulded as two half shells with a longitudinal rib extending along one of the longer sides thereof between the shells, and a plurality of ribs connected to the said longitudinal rib and extending transverse thereto between the said two half-shells.

Another aspect of this invention is a manufacturing method by which sun visors as defined above can be made. The method is simple and easy to perform. According to this latter aspect of the invention a process for the manufacture of sun visors of the type defined above comprises the steps of injection moulding a unitary body in a mould, the mould cavity of which defines two substantially rectangular half-shells joined along a longer edge thereof and reinforced by a longitudinal rib along the said longer edge with a plurality of transverse ribs extending therefrom, the two half-shells being divergent over a region adjacent the longer edge opposite the said longer edge along which extends the said longitudinal rib, removing the moulded body from the mould by means of at least one ejector operating on the longitudinal reinforcing rib, closing the divergent parts of the half-shells over the ends of the transverse ribs, welding together the peripheral edges of the half-shells and smoothing the welded edges thereof.

Various embodiments of this invention will now be more particularly described, by way of example, with reference to the accompanying drawings, in which:

FIG. 1 is a plan view, partially in section, of a sun visor for motor vehicles formed as an embodiment of this invention;

FIG. 2 is a longitudinal section of a part of the embodiment of FIG. 1, taken on the line II—II of FIG. 1;

FIG. 3 is a transverse section of the embodiment of FIG. 1, taken on the line III—III of FIG. 1;

FIG. 4 is a transverse section of the embodiment of FIG. 1, taken on the line IV—IV of FIG. 1, and showing the embodiment prior to completion, in the state in which it leaves a mould on which it is formed;

FIG. 5 is a schematic transverse section illustrating the mould used to form the embodiment of FIG. 1;

FIG. 6, is a schematic transverse sectional view similar to FIG. 5, illustrating the mould in an initial opening position;

FIG. 7 is a transverse section illustrating the removal of a moulded visor from a mandrel of the mould;

FIGS. 8 and 9 are two partial transverse sections illustrating the final steps in the completion of the visor;

FIG. 10 is a partial longitudinal section of a visor formed as a second embodiment of the invention; and FIG. 11 is a partial plan view of a visor formed as another embodiment of the invention.

Referring now to the drawings, the sun visor for motor vehicles shown in FIGS. 1 to 4 comprises a substantially flat generally rectangular unitary body 1, made by injection moulding from plastics material. The body 1 is formed from two symmetrical complementary half-shells 2. Between the half-shells 2 there are a number of transverse ribs 5 extending substantially parallel to the shorter sides of the body 1, and a single longitudinal rib 3 which extends inside the shells along one of the longer sides of the body 1.

In the embodiment shown in FIGS. 1 and 2 the ribs 5 have an X-section and in the embodiment of FIG. 10 the ribs 5a have a V-section with the V on its side.

On the longitudinal rib 3 there are a number of enlarged portions 4 on which an ejector device of the mould bears when the moulded visor is being ejected from the mould; there is also a moulded protuberance on one end of the body 1 against which an end part of the ejector device bears during ejection.

The cross sectional shape of the transverse ribs 5 facilitates the removal of a mandrel of the mould. For the same reason the half-shells 2 are moulded, as shown in FIG. 4 with only the parts adjacent the longitudinal rib 3 actually in contact; the parts 2a spaced from the rib 3 are moulded in an open, divergent position, as illustrated in FIG. 4; the separation of the half-shells extends along the longer sides 2a and also partly along the shorter sides. A suitable mould for forming the visor shown in FIGS. 1 to 4 is shown in FIGS. 5 and 6; this comprises two main dies 9 and a central mandrel 10 which, together with the two dies, forms the mould cavities A for the various parts of the visor. The mandrel 10 has two symmetrical enlargements 10a along one of the longer sides thereof, which define the inner faces of the divergent parts 2a of the two half-shells 2. After the injection and cooling of a plastics material into the mould, the two main dies 9 are moved apart to break the mould and the moulded visor remains in position on the central mandrel. After the separation of the main dies 9 an ejector 11, housed inside the mandrel 10 and bearing on the enlargements 4 of the longitudinal rib 3 and on the inner projection 4a, is advanced. The ejector or ejectors could also work on a part of the transverse ribs 5 or 5a.

As the ejector advances, the two portions 2a of the half-shells 2, being flexible, slip over the enlargements 10a of the mandrel allowing the disengagement of the workpiece therefrom. After removal from the mould the end portions 2a of the two half-shells 2 are closed together, as illustrated in FIG. 8, and welded along two peripheral terminal lips 6 on the edges. Subsequently the projecting parts of the lips 6 are smoothed, such as by filing, to complete the outside finish of the visor, as illustrated in FIG. 9.

The moulded visor is provided with a hinge which, in the example illustrated in FIG. 1, is formed by a cylindrical portion 8 provided with longitudinal grooves, at a central recess 7 in the longitudinal rib 3. In the alternative embodiment illustrated in FIG. 11, a hinge 8' carrying a spherical appendix 8'a is located at one end of the visor adjacent a corner thereof. The hinge 8' is aligned with the axis of the longitudinal rib 3 itself. In this alternative embodiment the visor may be additionally reinforced by means of a metal insert in the thickness of the longitudinal rib 3. Alternatively, the visor could be provided with two hinges, instead of one, each projecting from a respective end of the visor.

In one of the half-shells 2 of the embodiment illustrated in FIGS. 1 to 4 there is provided a courtesy mirror 12, which is fitted, after the visor is removed from the mould, into a mounting formed between the shell itself and those ribs 5' which cross the position at which the mirror is to be located. The mounting for the mirror comprises a generally rectangular opening 13 in the half-shell 2, defined by a frame 14 formed by raised resilient lips which project inwardly in the plane of the opening. The ribs 5' situated under the said opening have longitudinal recesses 15 against which the mirror engages. The recesses 15 have a shoulder 16 at one end thereof to locate the mirror in position while the two open parts of the half-shells are welded together; a moulded rib 17 on the half-shell 2 locates the edge of the mirror opposite that which engages the shoulder 16. After the welding of the two divergent parts 2a of the half-shells, the mirror is located securely in position in its seat so that it cannot be taken out.

When the two end parts 2a of the half-shells are welded together the inside space would remain hermetically sealed and the subsequent heating and cooling of the air contained therein could cause the deformation of the visor; to overcome this a number of small perforations 18 are envisaged in the curved parts of the half-shells to allow for air circulation. The inside cavities enclosed by the two half-shells could also be filled with a cellular material so as to increase the stiffness of the visor in normal use, but, at the same time to increase the capacity for absorbing impact.

One of the outside faces of the visor could be formed with an element to form a kind of pocket to carry small objects.

I claim:

1. A motor vehicle sun visor comprising a unitary substantially flat generally rectangular body of plastic material including two substantially rectangular half shells integrally connected along a first long edge, said shells being symmetrical with respect to a longitudinal middle plane extending substantially parallel to said shells, a longitudinal reinforcing rib extending between said half shells along said first long edge, a plurality of longitudinally spaced sets of connecting walls extending between the opposed inner surfaces of the two half shells, each set of connecting walls being formed by walls which are inclined with respect to said longitudinal middle plane and which mutually intersect along lines situated in said plane parallel to the short edges of said body, said connecting walls extending transversely of the visor from said first long edge into close proximity to the second long edge of said body and comprising a first portion adjacent said first long edge in which the transversely extending edges thereof are of integral one piece construction with said half shells and a second portion adjacent said second long edge in which said transversely extending edges are disposed in contact with said half shells, said half shells, said longitudinal reinforcing rib and said sets of connecting walls being formed as a unitary one piece molding with said two half shells being secured together along said second long edge and a portion of each of the two short edges adjacent said second long edge.

2. A motor vehicle sun visor as set forth in claim 1 wherein each of said sets of connecting walls has an X-shaped cross section.

3. A motor vehicle sun visor as set forth in claim 1 wherein each of said sets of connecting walls has a V-shaped cross section.

4. A motor vehicle sun visor as set forth in claim 1 wherein said longitudinal connecting rib is provided with enlarged portions intermediate adjacent sets of transverse walls.

* * * * *